United States Patent [19]

Nakamura et al.

[11] Patent Number: 4,878,520

[45] Date of Patent: Nov. 7, 1989

[54] HEAT INSULATING STRUCTURES FOR LOW-TEMPERATURE OR CRYOGENIC PIPINGS

[75] Inventors: Masao Nakamura, Honolulu, Hi.; Hiroshi Tonokawa, Suzuka, Japan

[73] Assignees: Asahi Kasei Kogyo Kabushiki Kaisha, Tokyo, Japan; The Dow Chemical Company, Midland, Mich.

[21] Appl. No.: 83,351

[22] PCT Filed: Jun. 7, 1984

[86] PCT No.: PCT/US84/00892
§ 371 Date: Jan. 22, 1986
§ 102(e) Date: Jan. 22, 1986

[87] PCT Pub. No.: WO86/00122
PCT Pub. Date: Jan. 3, 1986

[51] Int. Cl.$^4$ ............................. F16L 9/14; F17C 7/02
[52] U.S. Cl. ..................................... 138/149; 138/140; 264/321; 428/36.5

[58] Field of Search ............... 138/149, 177, 178, 141, 138/140, 137; 264/321; 428/35.7, 36.5, 36.9, 36.91

[56] References Cited

FOREIGN PATENT DOCUMENTS 106793 6/1984 Japan .................................... 138/149

Primary Examiner—James E. Bryant, III

[57] ABSTRACT

A heat insulating structure for low-temperature or cryogenic pipings, comprising at least one heat insulating barrier and at least one moisture barrier which are laid on the outer surface of a piping to be heat-insulated, and at least one sheating layer, wherein said heat insulating barrier comprises an extruded styrenic resin foam and wherein, as expressed in terms of the three-dimensional coordinates X (circumferential direction), Y (thicknesswise direction) and Z (longitudinal direction), said heat insulating barrier has a Y-axial water vapor permeability Py of 1.5 g/m$^2$·hr or less and at least the heat insulating barrier most adjacent to said piping has X-axial and Z-axial elongations at rupture Ex and Ez in the range of 8 to 40 percent.

1 Claim, 7 Drawing Sheets

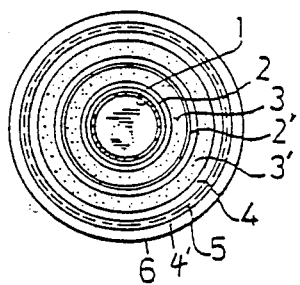
FIG. 1
FIG. 2
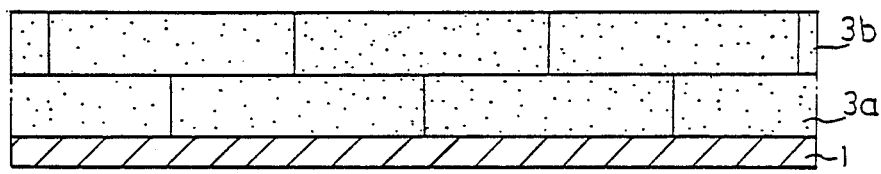
FIG. 3
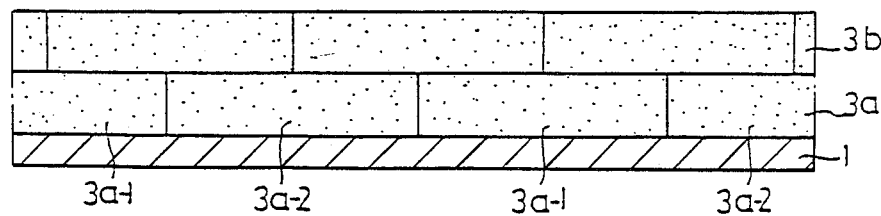
FIG. 4
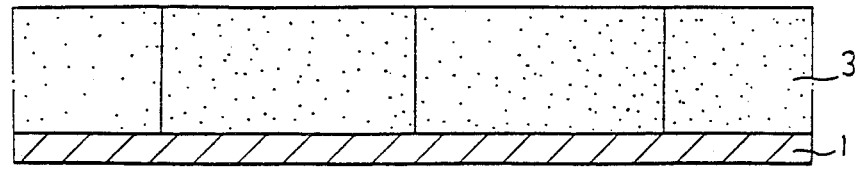

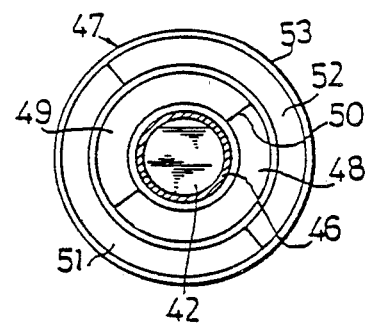
FIG. 13
FIG. 14
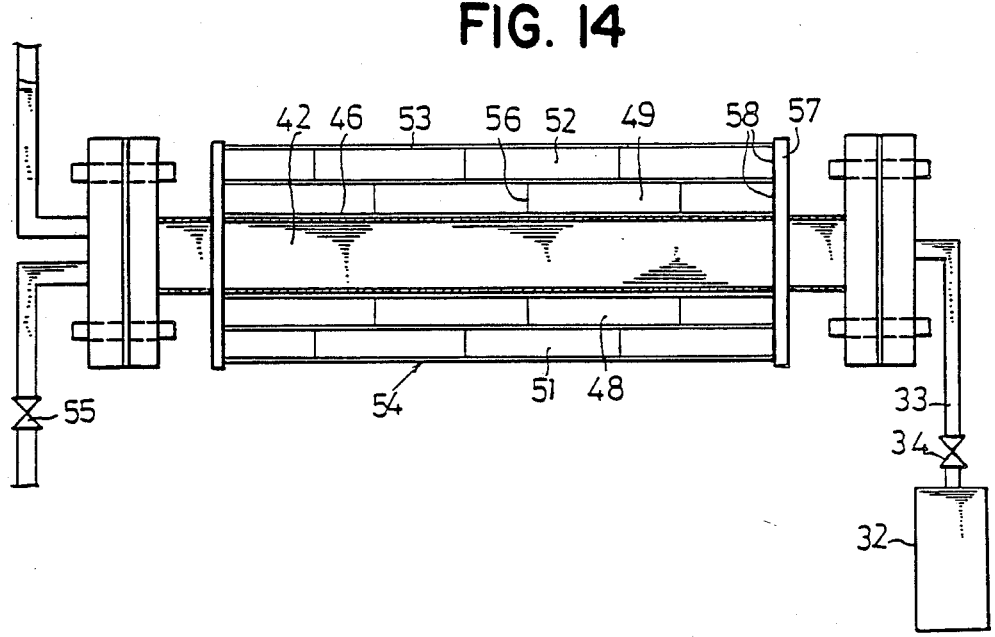

HEAT INSULATING STRUCTURES FOR LOW-TEMPERATURE OR CRYOGENIC PIPINGS

BACKGROUND OF THE INVENTION

The present invention relates to a heat insulating structure for low-temperature or cryogenic pipings and, more particularly, to such a heat insulating structure which is advantageously suited to heat insulation of pipelines transferring LNG or the like cryogenic fluids. An object of the present invention is to provide an improved heat insulating structure having an excellent heat insulating properties which is substantially free from cracking in heat insulating barriers thereof and which can be easily applied and affixed to pipes or other objects having curved surfaces.

Heretofore, many cryogenic pipings such as LNG pipelines have employed rigid polyurethane foams or the like rigid synthetic resin foams as their heat insulating materials. Such rigid synthetic resin foams have low thermal conductivity and are excellent in many other physical properties. However, such conventional rigid foams undergo large thermal expansion and shrinkage. For example, conventional rigid foams having a density of about 30 to 35 kg/m$^3$ undergo dimensional shrinkage of about 2.5 to 3 percent when the temperature changes about 180° C. (e.g., from room temperatures down to $-160°$ C.). Since such foams do not have flexibility or elongatability enough to accommodate to such a dimensional change without reluctance, cracks occur in heat-insulating barriers formed of such conventional rigid foams, resulting in reduced heat insulating properties of the barriers. One known solution to this drawback is to restrict the dimensional change of foams by embedding in the inner or outer surface portion or intermediate portion thereof glass meshes which undergo relatively small shrinkage at low or cryogenic temperatures. However, this solution also entails complicated working processes and economical demerits.

In the meantime, bending a board of conventional ridig foam to form the same into a shape fitting to the curvature of the surface of a pipe or the like object requiring heat insulation often causes cracks in the bent sections of the board of leaves there noticeable recesses or thickness loss due to a large compression strain. For solving this problem, such formed boards have had to be cut out from massive foams or they are prepared by expansion molding using molds appropriate to the sizes and shapes of the specific target boards. Thus, this method requires increased cost because of increased material quantity, equipment and manhour.

SUMMARY OF THE INVENTION

Accordingly, an object of the present invention is to solve the aforementioned drawbacks of the conventional heat insulating structures employing such rigid synthetic resin foams. More specifically, the present invention provides an improved heat insulating structure for low-temperature or cryogenic pipings, comprising at least one heat insulating barrier and at least one moisture barrier which are laid on the outer surface of a piping to be heat-insulated, and at least one sheathing layer, wherein said heat insulating barrier comprises an extruded styrenic resin foam and wherein, as expressed in terms of the three-dimensional coordinates X (circumferential direction), Y (thicknesswise direction) and Z (longitudinal direction), said heat insulating barrier has a Y-axial water vapor permeability $P_y$ of 1.5 g/m$^2$·hr or less and at least the heat insulating barrier adjacent to said piping has X-axial and Z-axial elongations at ruptures $E_x$ and $E_z$ in the range of 8 to 40 percent.

In the heat insulating structure according to the present invention, to foam layer adjacent to the low-temperature or cryogenic piping, namely the heat insulating barrier undergoing the greatest shrinkage by being exposed to the lowest temperature in the system, has an elongation at rupture of 8 to 40 percent in the circumferential and longitudinal directions. Extruded styrenic resin foams generally have a linear expansion coefficient in the order of $6 \times 10^{-5}$ to $20 \times 10^{-5}$ cm/cm·°C., while SUS-304 or the like piping material have a linear expansion coefficient in the order of $1 \times 10^{-5}$ to $2 \times 10^{-5}$ cm/cm·°C. Therefore, when a styrenic resin foam covering a piping is cooled by a low temperature or cryogenic fluid flowing therethrough, the resultant temperature causes the foam to tend to shrink differently from the piping. That is to say, a thermal stress occurs in the styrenic resin foam. However, if the foam has an elongation at rupture of the order of 8 to 40 percent, it can sufficiently absorb and relieve the shrinkage stress and its cracking can be prevented. For example, in a cryogenic piping of SUS-304 for liquid helium (boiling point: $-267°$ C.) insulated with a styrenic resin foam having the linear expansion coefficient of $20 \times 10^{-5}$ cm/cm·°C., the heat insulating material shrinks about 5.5 percent larger than the SUS-304 pipe does. Assuming here that the elongatability of the foam deteriorates 50 percent as a result of this temperature drop and that the design safety factor incorporated is 3, crack failure of the foam can be prevented if it has 40 percent or higher elongation at rupture.

Further, according to the present invention, since at least that heat insulating barrier adjacent to the piping has a Y-axial water vapor permeability of 1.5 g/m$^2$·hr or less, a high moisture barrier properties can be secured as combined with the moisture preventing actions of the sheathing and moisture barrier materials. Thus, the heat insulating structure according to the present invention not only can have lasting high heat insulating properties but is substantially free from breakage of its heat insulating barriers due to freezing.

Hereinafter, the present invention will be described in greater detail with reference to the accompanying drawings.

BRIEF DESCRIPTION OF THE DRAWINGS

FIG. 1 is a cross-sectional view of one preferred embodiment of the heat insulating structures according to the present invention;

FIGS. 2, 3 and 4 are schematic longitudinal sections showing the modes of attaching the heat insulating barriers to pipes;

FIG. 13 is a cross-section of foams fitted to a cryogenic piping;

FIG. 14 is a longitudinal section of the foams and pipes of FIG. 13, which are connected to a cryogenic test line.

In FIG. 1 showing a cross-section of one preferred embodiment of the heat insulating structures according to the present invention, reference numeral 1 is a piping transferring a cryogenic fluid, on the surface of which is applied a parting layer 2 of plastic film. Two heat insulating barriers, 3, 3' of extruded styrenic resin foam are laminatedly disposed on the outside of the parting layer 2 with interposition of another parting layer 2' of plastic film. Reference numerals 4, 4' denote mastic moisture barriers laid on the outer heat insulating barrier 3' with interposition of a glass-fiber reinforcement layer 5. Further, a sheathing layer 6 of sheet steel is disposed on the outer mastic moisture barrier 4'.

Figure 5:
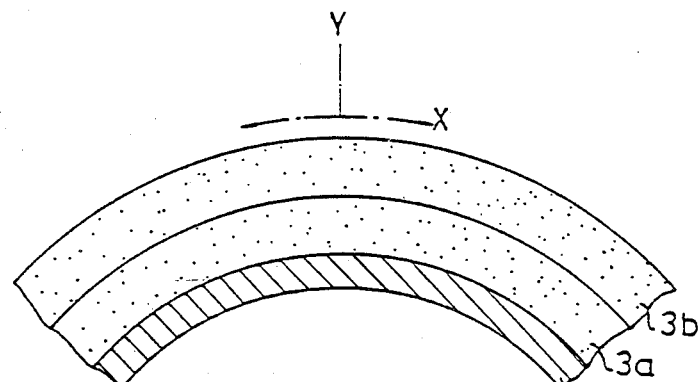
FIG. 5 is a partial cross-sectional view showing the heat insulating barriers fitted onto a cryogenic piping.

In the present heat insulating structure, the laminated heat insulating barriers 3, 3' of extruded styrenic resin foam each have Y-axial water vapor permeability Py of 1.5 g/m²·hr or less and X-axial (circumferential) and Z-axial (longitudinal) elongations at rupture Ex and Ez in the range of 8 to 40 percent.

However, it is not necessary that all styrenic resin foam heat insulating barriers have X-axial and Z-axial elongations at rupture Ex and Ez in the range of 8 to 40 percent, but it is only necessary that at least the heat insulating barrier adjacent to the low-temperature or cryogenic piping has Ex and Ez falling within the aforementioned range. For example, in a structure having two heat insulating barriers comprising an inner form 3a and outer foam 3b, respectively, as shown in FIG. 2, the inner barrier foam 3a adjacent to the piping 1 must have Ex and Ez in the range of 8 to 40 percent, while for the outer barrier foam 3b it is sufficient that only its Ex ranges from 8 to 40 percent with its Ez falling below the lower limit of said range. In some cases, the outer barrier foam 3b may have Ex and Ez both lower than 8 percent. As shown in FIG. 3, the inner barrier foam 3a may be constructed so that foam sections 3a-1 having higher elongations at rupture in both directions (i.e., both Ex and Ez ranging from 8 to 40 percent) are disposed alternately with foam sections 3a-2 having a higher elongation at rupture only in one direction (e.g., only Ex being 8 to 40 percent) or having Ex and Ez both falling below the lower limit with their cut end faces butted, so long as Ex and Ez of the entire inner barrier 3a are kept in the range of 8 to 40 percent on the average. As shown in FIG. 4, it will be readily appreciated that the heat insulating structure of the present invention may comprise only one layer of styrenic resin foam 3 of which Ex and Ez are in the range of 8 to 40 percent. For the aforementioned structure in which the outer barrier foam has a higher elongation at rupture only in one direction or elongations at rupture below 8 percent in both directions, it is necessary to determine the temperature at the interface between the inner and outer barriers and to use as the outer heat insulating barrier a foam having an elongation at rupture falling within a range in which the shrinkage occurring at that temperature can be absorbed sufficiently.

Figure 7:
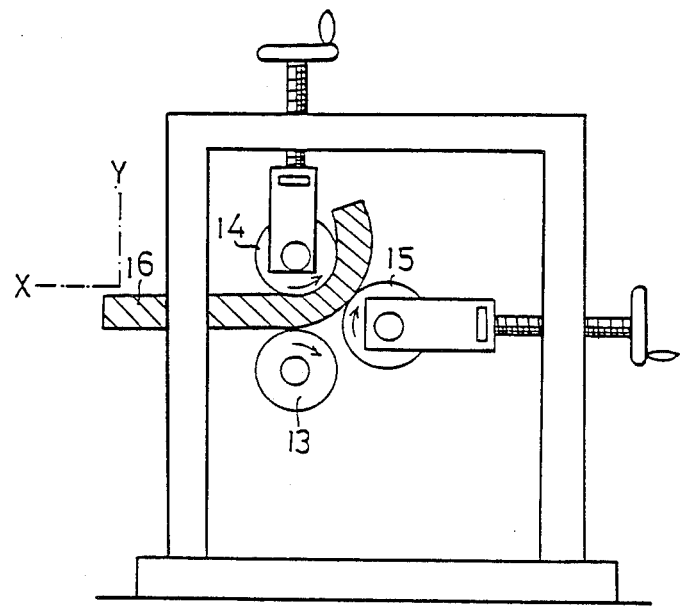
FIG. 7 is a schematic diagram of a typical example of bending machines for bending the flexibilized foams to a curvature of target surface.

To form a styrenic resin foam into a heat insulation barrier having a curved shape in cross-section as shown in FIG. 5, the foam may be bent easily by using a bending machine, for example, as shown in FIG. 7. For this, it is necessary to set the design parameters affecting the X-axial and Z-axial elongations at rupture Ex and Ez by taking into consideration a deterioration of elongation through the bending process and a further deterioration of elongation to be caused by a temperature drop when it is used as installed on a low-temperature or cryogenic object. More specifically, it is necessary to set the design parameters so that the resultant heat insulating barrier has an elongation at rupture ranging from 8 to 40 percent in both the circumferential and longitudinal directions as built in the heat insulating structure of the present invention.

The extruded styrenic resin foams herein referred to are substantially closed-cell structure obtained by extrusion-expanding synthetic resins mainly composed of styrene, α-methylstyrene, vinyltoluene, chlorostyrene or the like styrenic monomers. As such synthetic resins, also usable are copolymers of styrene or the foregoing styrenic monomers and other monomers copolymerizable therewith such as acrylonitrile, methacrylonitrile, methyl acrylate, methyl methacrylate, maleic anhydride, acrylamide, vinylpyridine, acrylic acid, methacrylic acid and so on. To improve toughness, rubber may be blended with such monomers before polymerization or added to the system under polymerization. Further, the foregoing resins may be blended with other polymers so long as the desirable properties of the resins are not affected adversely by such blending. However, most preferably for the present invention are foams extrusion-expanded from styrenic resin consisting of styrene monomer units only.

Further, according to the present invention, it is preferably that the extruded styrenic resin foams have a density in the range of 20 to 60 kg/m³. Foams having a density smaller than 20 kg/m³ are not desirable because of their insufficient heat insulating properties and compression strength and too high water vapor permeability. While, foams having a density higher than 60 kg/m³ are also undesirable because difficulties will be encountered in bending them along pipings. To secure foam and dimensional stability and to prevent breakage when applying the heat insulating structure onto a piping, it is desirable that the styrenic resin foam therefor has a compression strength of at least 2 kg/cm² (in terms of 10 percent compression strength or compressive yield strength). Further, the foam used for the present invention must have a Y-axial water vapor premeability Py of 1.5 g/m²·hr or less. For securing heat insulating properties for a further longer period of time, it is preferable to use foams having Py of 1.0 or less.

Figure 6:
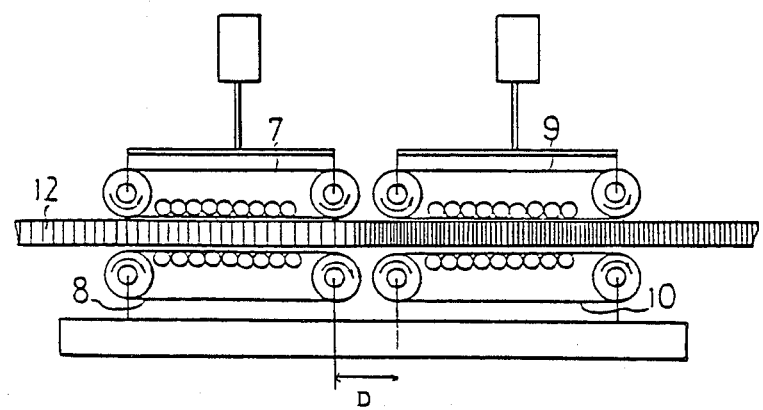
FIG. 6 is a schematic diagram of the flexibilizer used to compress styrenic resin foams for flexibilizing the same.

Generally, extruded styrenic resin foams have an elongation at rupture in the order of 5 percent. Thus, to impart an elongation at rupture in the range of 8 to 40 percent to extruded styrenic resin foams according to the present invention, an equipment as schematically shown in FIG. 6 (hereinafter shall be referred to as flexibilizer) may be used, for example. In FIG. 6, the flexibilizer is provided with a pair of infeed belts 7, 8 and a pair of outfeed belts 9, 10, which are spaced from longitudinally from each other. The infeed rollers 7, 8 are driven somewhat faster than the outfeed belts, 9, 10 so that an extruded styrenic resin foam 12 feed is compressed and flexibilized in the machine direction to the gap between the infeed and outfeed belts. First, the aforementioned X-axial direction may be aligned with the machine, for example. By adequately adjusting the differential speed between the infeed and outfeed belts, 8 percent or higher elongation at rupture can be imparted to the resultant flexibilized foam. Then, the foam is compressed for flexibilization in the remaining direction (Z-axis) in the same manner as above.

Various methods may be used to bend the flexibilized styrenic resin foam boards to the curvature of a pipe. For example, a foam board as brought into contact with the pipe may be bent by applying a bending stress Y-axially thereto with its X-axis disposed in the direction of hoop stress. Alternatively, a bending machine as shown in FIG. 7 may be used. This bending machine as shown in FIG. 7 may be used. This bending machine has one fixed roll 13 and two movable rolls 14 and 15. These three rolls turns in the directions indicated by the respective arrows. The flexibilized foam board are fed into the gap defined by the fixed roll 13 and the movable roll 14 with the X-axis disposed in the feeding direction. Thence the board advances through the gap between the movable rolls 14 and 15 to be bent along the surface of the roll 14. The radius of curvature of the bend is variable with the diameter of the movable roll 14 and the position of the movable roll 15 relative to the roll 14.

It is desired to bend the foam board to a curvature almost equal to the curvature of the target pipe. Although the foam once bent to the curvature of the target pipe may bend backward to increase its radius of curvature as the stress is relieved with time, it can be bent again easily to the initial curvature and fitted closely onto the pipe.

In view of transportation efficiency, the bending work should desirably be done in the field.

To secure the foams shape bent to the curvature of the target pipe, thermoforming process may be resorted to. More specifically, the foam board is first bent mechanically to the target curvature to improve its thermoformability. The bend board is then secured onto the surface of a columnar body or, more preferably, a cylindrical body having a 17 to 750 mm radius of curvature to be heated in the secured state at 65° to 105° C. or, more preferably, at 80° to 85° C., followed by cooling. The heating time varies from 15 to 120 minutes depending on the foam board thickness, deformation by the preceding mechanical bending and other factors. In this respect, it is only necessary for the heating conditions to relieve the deformation stresses in the inner and outer curved portions for substantially eliminating residual stresses therefrom. For the initial mechanical bending, various methods may be used. However, in view of the uniformity of bending, it is desirable to resort to such a bending machine as mentioned previously.

Generally, desirable thickness of heat insulating barriers of styrenic resin foam ranges from about 20 mm to 150 mm. Covers thinner than 20 mm cannot provide effective heat insulating properties. While, foams thicker than 150 mm are difficult to bend because considerable compression and elongation occur in the inner and outer bent layers, respectively, to cause there undesirable strains and cracks.

Further, heat insulating structures for low-temperature or cryogenic pipings require means for preventing moisture or water absorption in the heat insulating barriers thereof. The styrenic resin foams used in the present invention have a Y-axial water vapor permeability Py of 1.5 $g/m^2 \cdot hr$ or less. However, since no foams can have a perfect impermeability to moisture, moisture will build up with time in the heat insulating barriers due to differential water vapor pressure between the inside and outside of the barriers. As a result, the heat insulating barriers will have increased thermal conductivity with reduced heat insulating properties and in the worst case will be broken. This tendency becomes remarkable especially when there is a very large difference in temperature between the atmosphere and the object covered with the barriers.

Therefore, a moisture barrier is indispensible the heat insulating structures for low-temperature or cryogenic pipings. Desirably, the moisture barrier should be disposed on the higher temperature side of the heat insulating structure.

As moisture barriers, usable are plastic sheets having a high impermeability to moisture, sheet metals, mastic and the like. When using mastic as moisture barrier, it is desired that the mastic is applied in multi-layers with the aid of glass mesh reinforcement. The moisture barriers need not be provided separately from styrenic resin foams, but may be integrally preincorporated therein.

For a heat insulating structure, the sheathing is also one of important elements. A purpose of the sheathing is to protect the performance of the foams from meterorological and other surrounding conditions as well as to permit identification of the fluids handled by the piping while providing an aesthetic appearance.

As the sheathing, sheet metals such as colored steel sheets and stainless steel sheets or FRP are used commonly. From advantages of higher durability and fire resistance, sheet metals are used mainly. However, adequate care must be exercised when joining and attaching such sheathing materials. If the moisture barrier can function also as a sheathing, the latter need not be provided otherwise. Hereinafter, the present invention will be described in greater detail by the preferred examples thereof and reference examples, in which evaluation is made based on the properties tested as follows.

Test Procedures (1) Foam density

Five cubes are cut from each styrenic resin foam board so that the edge length is equal to the board thickness. Then, the weights and volumes of these cubes are measured to determine their densities. In Table 1, the foam density D is given in $kg/m^3$ as the average of these five specimens.

(2) Y-axial compressive strength

Five cubic specimens are cut from each foam board in the same manner as in the preceding foam density test. Then, each specimen is subject to compressive strength test in the thicknesswise direction (Y-axially) in accordance with ASTM D 1621. The test is made at 10 percent compression strain, provided that compressive yield strength is measured if the specimen is to yield at a compression smaller than 10 percent. The results are given in $kg/cm^2$ as the average of the five specimens.

(3) Water vapor permeabiltiy

Three circular specimens each 90 mm across and 25 mm thick are cut from each foam board and subjected to water vapor permeability test in accordance with ASTM C 355 using distilled water. From the measurements, the water vapor permeability is calculated by using the following formula. The results are given in $g/m^2 \cdot hr$ as the average of the three specimens.

Water vapor permeability = $G/A \times t (g/m^2 \cdot hr)$ where:
G = change in specimen weight (g);
A = area subjected to water vapor transmission (m²)
t = time in which the specimen weight changes by G gram (hr).

(4) Percentage elongation at rupture

In accordance with ASTM D 1623B, two groups of 5 specimens, each 25 mm cube, are subjected to X-axial and Z-axial tensile strength test, respectively, to determine their elongations at rupture, from which the percentage elongations at rupture Ex and Ez are calculated by using the following formula, respectively:

$Ex, Ez$ = elongation at rupture (mm)/specimen thickness (mm) × 100(%)

Stress rate: specimen thickness (mm) × 0.05/min.

(5) Thermal conductivity change with time

Figure 8:
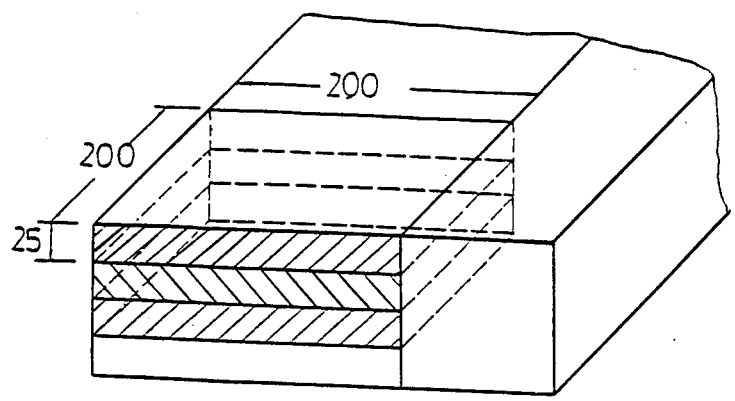
FIG. 8 is a perspective showing the mode of sampling the specimens for the test of thermal conductivity change with time.
Figure 9:
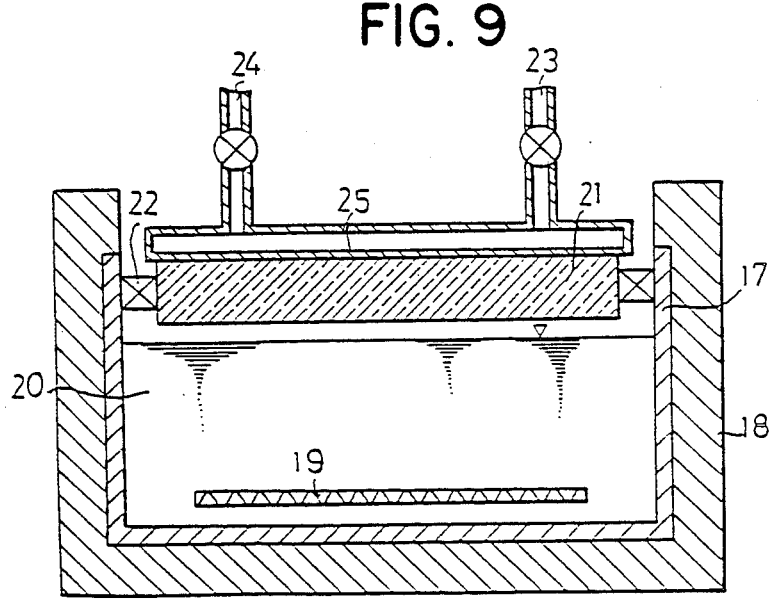
FIG. 9 is a schematic section of an aging apparatus used in the test of thermal conductivity change with time.

As shown in FIG. 8, a flexiblized foam board is cut into specimens each of 200 mm square and 25 mm thick. Each of the thus prepared foam specimens is aged by using an aging apparatus schematically shown in FIG. 9. In FIG. 9, the aging apparatus comprises a container 17 provided with a temperature controller 19. The entire wall of the container 17 is entirely covered with a heat insulating material 18. The container 17 is filled with water 20, of which temperature is kept at 27° C. For aging, the specimen is placed in it about 30 mm above the water surface and the gap between the specimen 21 and the inner wall of the container is closed with a suitable packing 22. Then, a cold plate 25 cooled to 2° C. by recirculated cooling water is brought into tight contact with the top of the specimen 21.

Under this condition, the specimen is aged for 14 days. Thereafter, the specimen is taken out and its surface is wiped lightly with gauze. The thermal conductivity λ' of the thus aged specimen is measured in accordance with ASTM C 518. To determine the thermal conductivity change with time, the ratio of λ' to the initial thermal conductivity λ of the specimen before aging is calculated. For evaluation, the following schedule is applied.

| Thermal Conductivity Change with Time (λ'/λ) | Evaluation Ranks |
| --- | --- |
| Smaller than 1.07 | Good (quality currently demanded by the market) |
| 1.07 or greater but smaller than 1.12 | Passable (target quality of conventional foams) |
| 1.12 or greater | Unacceptable (quality of conventional foams) |

(6) Cryogenic resistance

Figure 10:
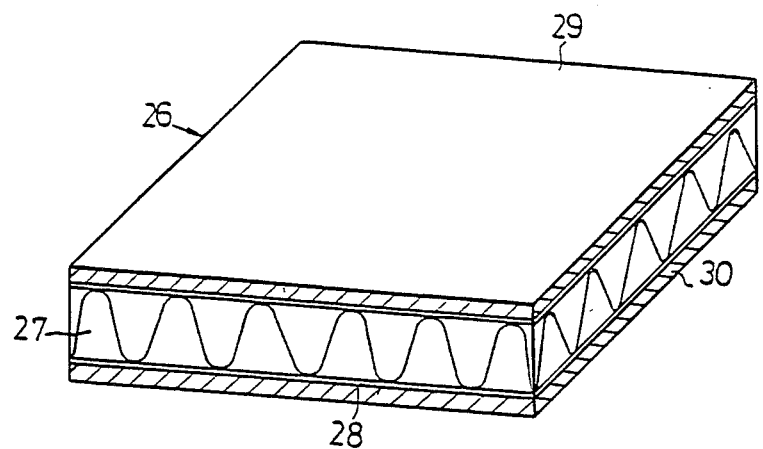
FIG. 10 is a perspective of a cryogenic test panel.

Each flexibilized foam is cut into specimens 50 mm thick, 300 mm wide and 300 mm long. After smoothening the top and bottom surfaces by machining and providing markings for identifying the X- and Z-axes, each specimen 27 has their top and bottom surfaces covered with plywoods 29 and 30 (conforming to Japanese Agriculture Standard) 12 mm thick cut to 300 mm length and the specimen width (300 mm), as shown in FIG. 10. For this, two-part polyurethane adhesive 28 for cryogenic use (sumitac EA90177 produced by Sumitomo Bakelite Co., Ltd., Japan) to the joint surfaces. The thus prepared cryogenic test panel 26 is placed under pressure of 0.5 kg/cm² for 24 hours at 23° C. to cure the adhesive. Three such panels 26 are prepared from each flexibilized foam for each of the cryogenic tests at −160° C. and −196° C.

(a) Cryogenic test at −160° C.

Figure 11:
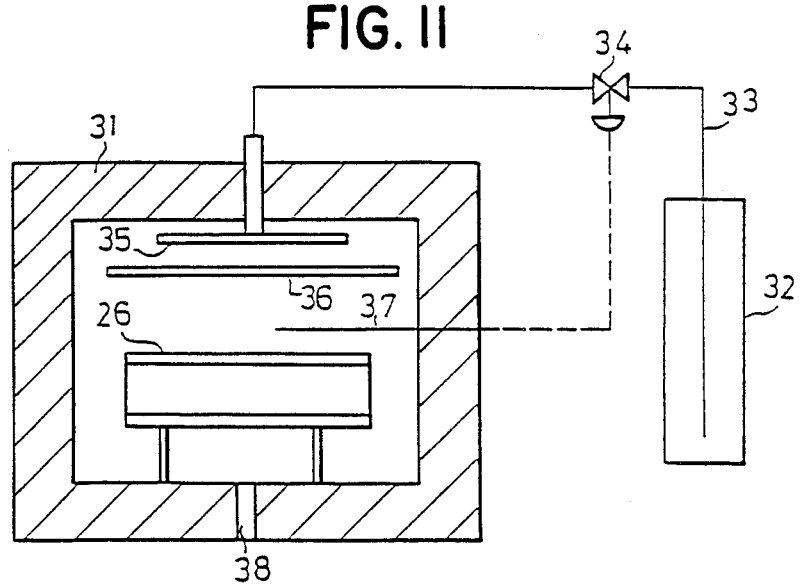
FIG. 11 is a schematic section of a cryostat used for the cryogenic test at $-160°$ C.

Each cryogenic test panel 26 is suddenly placed in a cryostat 31 having the internal temperature controlled to −160° C. ±5° C., as shown in FIG. 11. After being kept therein for 5 hours, the test panel is taken out suddenly therefrom and left to stand at room temperatures for about one hour. This process is repeated three cycles. Upon completing the third cooling step, the test panel 26 taken out from the cryostat 31 is checked for cracks in the four exposed faces of the foam specimen 27 together with the directions of such cracks. One hour thereafter, the plywood covers 29 and 30 are removed from the foam specimen 27 by means of a slicer. Further, the foam specimen 27 is sliced to the thickness of about 10 mm along the top surface thereof. Then, a mixture of a surfactant and colorant in water is applied onto the surfaces of each sliced specimen to observe cracks formed therein. The observations are recorded together with the directions of the cracks. In the cryostat 31 used in the aforementioned experiment, the test panel 26 is cooled by liquid nitrogen which is fed from a bomb 32 through feed pipe and injected from a nozzle 35 onto a baffle plate 36, where it is gasified and diffused to cool the inside of the cryostat uniformly, as shown in FIG. 11. The reference numeral 38 is a nitrogen gas outlet. Further, the cryostat is provided with a control unit which cooperates with a thermocouple 37 and a time (not shown) to control the opening of an automatic flow control valve 34 which in turn controls the flow rate of the liquid nitrogen for maintaining the cryostat at a predetermined temperature.

(b) Cryogenic test 16 −196° C.

Figure 12:
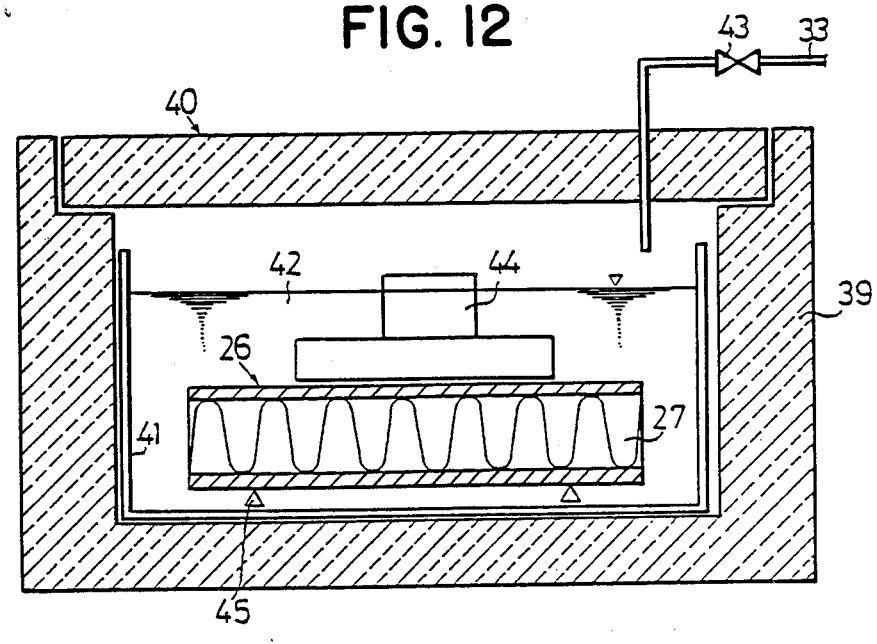
FIG. 12 is a schematic section of a cryogenic cooling equipment used for the cryogenic test at $-196°$ C.

For this test, is used a cryogenic cooling equipment 40 having a liquid nitrogen container 41 of stainless steel totally housed in an enlcosure 39 of heat insulating material, as schematically shown in FIG. 12. More specifically, the container 41 is filled with liquid nitrogen 42 having a temperature of −196° C. which is fed with a bomb (not shown) through a feed pipe 33 having an on-off valve 43, and each test panel 27 prepared in the aforementioned manner is suddenly immersed well deep in the liquid nitrogen with its bottom supported on steel bearers 45 placed on the container bottom. Then, a steel weight 44 precooled in liquid nitrogen is placed on the test panel top, and the test panel is kept immersed for 30 minutes. At the end of the immersion period, the test panel 26 is taken out into the atmosphere to be left to stand for one hour under forced ventilation. After repeating the foregoing process three cycles, check is made for surface and internal cracks including their directions in the same manner as in the preceding test at −160° C. Also, the observations are recorded. For evaluation of the cryogenic resistance of each flexibilized foam, the following schedule is applied based on the observations on both of the two groups of three specimens tested at 160° C. and 196° C., respectively.

| Observations | Evaluation Ranks |
| --- | --- |
| No damage or cracks | Good (quality currently demanded by the market) |
| Fine cracks partially observed | Passable (target quality of conventional foams) |
| Ruptures or large cracks observed | Unacceptable (quality of conventional foams) |

(7) Cryogenic pipe insulation

First, foam pieces of 25, 37.5 or 75 mm (thickness)×500 mm×500 mm are prepared. These foam pieces are bend, in one, two or three layers having overall thickness of 75 mm, to the curvature of a steel pipe of about 114 mm in outside diameter by applying a bending stress Y-axially with the Z-axis thereof disposed in parallels with the axis of the pipe. In the bent state, the foam pieces are thermoformed by heating at 85° C. for 45 minutes and then leaving to cool at room temperatures for two hours. The thus thermoformed foam pieces are cut Z-axially to obtain semicylindrical cover members each 500 mm long.

The 75 mm thick members are fitted in one layer onto the entire surface on a 114 mm o.d. stainless steel pipe 46 about 2 m long with flanges 57 at each end and secured with a cryogenic polyurethane adhesive (Soflannate #5006-P/#5006-R) produced by Toyo Rubber Co., Ltd., Japan). The same adhesive is used to joint the joints 50, 56 of adjacent semicylindrical members and to join the outer ends 58 of the outermost members to the flanges (refer to FIG. 14). While, the 37.5 mm thick members are fitted in two layers as shown in FIGS. 13 and 14.

First, the inner layer members 48, 49 are fitted in the same manner as the 75 mm thick members. Then, the outer layer members 51, 52 are fitted onto the inner layer by using the same adhesive. The joints of the outer layer members are staggered from those of the inner layer members. The 25 mm thick members are fitted in three layers in the manner as the two-layer covering.

Then, the outer surfaces of these heat insulation covers are coated with a 0.25 mm thick waterproof layer of polyurethane mastic (Eastonate A No. 9840A produced by Nichias Corp., Japan). After four days aging, each of these covered pipes 46 is connected to a cryogenic piping test equipment 54 and liquid nitrogen 42 is suddenly introduced therein from a liquid nitrogen bomb 32 through a flexible pipe 33 and manually-controlled valve 34, as shown in FIG. 14. In this manner, the interior of the stainless steel pipe 46 is left to stand for 12 hours at 23° C. and 80 percent RH. The foregoing process of cooling and leaving to stand is repeated four cycles, in the course of which the surface conditions of the water-proof layer 53 including water condensation and icing thereon are observed and recorded.

For evaluation of the cryogenic heat insulating properties, the following schedule is applied.

| Surface Conditions | Evaluation Ranks |
|---|---|
| No changes observed in the surface conditions | Good (quality currently demanded by the market) |
| Occasionally moisture condensation appears only briefly | Passable (target quality of conventional foams) |
| Moisture condensation or icing appears over long duration | Unacceptable (quality of conventional foams) |

(8) Cryogenic crack resistance test

Immediately after the preceding tests, the waterproof coating and foam insulation layers are carefully removed and visually examined for cracks using a colorant solution if necessary.

For evaluation, the following schedule is applied.

| Observation | Evaluation Ranks |
|---|---|
| No damage or cracks | Good (quality currently demanded by the market) |
| Fine cracks partially observed | Passable (target quality of conventional foams) |
| Ruptures or large cracks observed | Unacceptable (quality of conventional foams) |

EXAMPLE 1

Preferred Examples (Runs No. 1–18) and Reference Examples (Runs No. 19–33)

Styrenic resin foam boards 100 mm thick having 37 kg/m$^3$ density were mechanically compressed for flexibilization X-axially first and then Z-axially by using the flexibilizer shown in FIG. 6. Typical conditions involved in the compression process are shown in Table 3 to be given later. Among these conditions, only the infeed/outfeed speed ratio and cycles of compression were varied appropriately from run to run.

In the reference example, there were also prepared, for the purpose of comparison, a non-flexibilized foam (run No. 19), foams flexibilized only X-axially (runs No. 30–33) and foams flexibilized only Z-axially (runs No. 21–24).

Then, in the aforementioned manner, these foams were evaluated based on their densities D, Y-axial compression strengths and water vapor permeability Py, X-axial and Z-axial percentage elongations at rupture Ez and Ez, Y-axial thermal conductivity change with time, and cryogenic resistance at −160° C. and −196° C., the results of which are given in Table 1.

Finally, overall evaluation rating was made on the following scale from viewpoint of applicability to the heat insulating structures according to the present invention:

| Excellent (EX) | Rated good in all tests |
|---|---|
| Good (GO) | Rated good/passable in all tests |
| Unacceptable (UN) | Rated unacceptable in at least one test |

From Table 1, it will be obvious that the foams contemplated for the heat insulating structures of the present invention must have an X-axial and Z-axial elongations at rupture in the range of 8 to 40 percent with 1.5 g/m$^2$·hr or lower water vapor permeability. Further, for securing improved lasting heat insulating properties as required for heat insulation of LNG or the like cryogenic substances, it is preferable to use extruded styrenic resin foams having Ex and Ez ranging from 12 to 40 percent and Py of 1.0 g/m$^2$·hr or less.

EXAMPLE 2

(Runs No. 34–48)

From the foams used in the preceding Example 1, four biaxially-flexibilized foams ranked as Good or Excellent, one biaxially-flexibilized foam ranked as Unacceptable and three one-axially (X-axially) flexibilized foams were selected and subjected to tests of bendability, thermoformability, heat insulating properties and cryogenic crack resistance in the aforementioned manner.

In these tests, the foams having about 100 mm thickness were sliced to a thickness of 25, 37.5 or 75 mm and applied onto a stainless steel pipe of about 114 mm in outside diameter in one, two or three layers to obtain an overall thickness of 75 mm. The longitudinal and circumferential seams of the semicylindrical foam sections applied in layers were butted, while those of the foam sections 75 mm were shiplapped.

The results of tests and evaluation are given in Table 2. As understood from Table 2, the two-directionally flexibilized foams satisfying the requirements of the present invention show excellent bendability, thermoformability and applicability even to such pipes having a diameter as small as 114 mm. More specifically, such foams can be applied to such small-diameter pipes, without requiring any large force therefor, merely by appropriately adjusting the extensitility of the foams in the bending direction to the pipe outside diameter and the foam thickness. Also, since such foams can be easily thermoformed to their bent shape, their application works are much facilitated. Further, because of substantial freedom from crack formation in bending operation or under cryogenic conditions, the styrenic resin foams satisfying the requirements of the present invention can provide excellent cryogenic heat insulating materials free from moisture condensation even at $-196°$ C. and therefore are advantageously applicable to low-temperature or cryogenic pipings.

Although the reference foams compressed only X-axially or Z-axially have satisfiable bendability and thermoformability, they cannot function satisfactorily as cryogenic heat insulating barriers because they are broken when used under cryogenic conditions due to cracks spreading circumferentially of the pipe or in other directions. Such cracks are formed because these foams do not have suffficient extensibility in the X-axial or Z-axial direction and therefore cannot absorb thermal tresses generated by sudden temperature changes between the room and cryogenic temperatures.

TABLE 1

| Run No. | Foam Density $(Kg/m^3)$ | Elongation at Rupture (%) | | Water Vapor Permeability $Py (g/m^2h)$ | Thermal conductivity change with time | Cryogenic Test | | | | Overall Evaluation |
| | | | | | | $-160°$ C. | | $-196°$ C. | | |
| | | X-axial Ex | Z-axial Ez | | | X-axial | Z-axial | X-axial | Z-axial | |
|---|---|---|---|---|---|---|---|---|---|---|
| 1 | 30.0 | 8.0 | 8.0 | 0.53 | GO | GO | GO | PA | PA | GO |
| 2 | 32.9 | 9.3 | 18.4 | 0.7 | GO | GO | GO | PA | GO | GO |
| 3 | 37.0 | 10.9 | 31.2 | 0.78 | GO | GO | GO | PA | GO | GO |
| 4 | 39.7 | 12.0 | 40.0 | 0.9 | GO | GO | GO | GO | GO | EX |
| 5 | 43.7 | 13.3 | 50.4 | 1.05 | PA | GO | GO | GO | GO | GO |
| 6 | 35.5 | 12.0 | 25.3 | 0.75 | GO | GO | GO | GO | GO | EX |
| 7 | 31.7 | 12.0 | 12.0 | 0.65 | GO | GO | GO | GO | GO | EX |
| 8 | 35.6 | 16.5 | 21.2 | 0.75 | GO | GO | GO | GO | GO | EX |
| 9 | 41.1 | 21.6 | 33.5 | 0.95 | GO | GO | GO | GO | GO | EX |
| 10 | 46.6 | 30.2 | 40.0 | 1.20 | PA | GO | GO | GO | GO | GO |
| 22 | 38.5 | 7.4 | 40.2 | 0.88 | GO | PA | GO | UN | GO | UN |
| 23 | 44.4 | 7.6 | 61.5 | 1.15 | PA | PA | GO | UN | GO | UN |
| 24 | 49.1 | 8.8 | 75.3 | 1.52 | UN | GO | GO | PA | GO | UN |
| 25 | 53.7 | 23.3 | 70.0 | 1.55 | UN | GO | GO | GO | GO | UN |
| 26 | 57.4 | 36.5 | 64.0 | 1.65 | UN | GO | GO | GO | GO | UN |
| 27 | 58.0 | 50.3 | 50.8 | 1.70 | UN | GO | GO | GO | GO | UN |
| 28 | 56.7 | 63.2 | 35.0 | 1.67 | UN | GO | GO | GO | GO | UN |
| 29 | 51.7 | 72.0 | 20.5 | 1.57 | UN | GO | GO | GO | GO | UN |
| 30 | 48.6 | 74.5 | 9.0 | 1.55 | UN | GO | GO | GO | PA | UN |
| 31 | 44.7 | 62.8 | 7.7 | 1.20 | PA | GO | PA | GO | UN | UN |
| 32 | 38.2 | 38.7 | 7.3 | 0.9 | GO | GO | PA | GO | UN | UN |
| 33 | 32.8 | 20.6 | 6.8 | 0.7 | GO | GO | PA | GO | UN | UN |
| 11 | 40.8 | 26.5 | 27.0 | 1.0 | GO | GO | GO | GO | GO | EX |
| 12 | 46.0 | 33.7 | 33.5 | 1.15 | PA | GO | GO | GO | GO | GO |
| 13 | 32.9 | 17.7 | 9.2 | 0.57 | GO | GO | GO | GO | PA | GO |
| 14 | 35.9 | 22.0 | 15.5 | 0.78 | GO | GO | GO | GO | GO | EX |
| 15 | 35.5 | 25.2 | 12.0 | 0.8 | GO | GO | GO | GO | GO | EX |
| 16 | 37.0 | 30.5 | 10.8 | 0.8 | GO | GO | GO | GO | PA | GO |
| 17 | 40.7 | 34.1 | 18.5 | 0.91 | GO | GO | GO | GO | GO | EX |
| 18 | 39.7 | 40.0 | 12.0 | 0.93 | GO | GO | GO | GO | GO | EX |
| 19 | 27.2 | 5.3 | 4.4 | 0.48 | GO | UN | UN | UN | UN | UN |
| 20 | 29.1 | 7.3 | 6.7 | 0.50 | GO | PA | UN | UN | UN | UN |
| 21 | 32.2 | 6.9 | 18.5 | 0.62 | GO | UN | GO | UN | GO | UN |

NOTES:
EX ... Excellent
GO ... Good
PA ... Passable
UN ... Unacceptable

TABLE 2

| Runs No. | Foams Tested (Run No.) | Pipe Outside Diameter (mm) | Total Thickness of Heat Insulating Materials (mm) | Layers of Heat Insulating Material | One Layer Thickness (mm) | Heat Insulating Properties |
|---|---|---|---|---|---|---|
| 34 | 7 | 114 | 75 | 2 | 37.5 | GO |
| 35 | 14 | 114 | 75 | 2 | 37.5 | GO |
| 36 | 14 | 114 | 75 | 1 | 75 | GO |
| 37 | 10 | 114 | 75 | 1 | 75 | GO |
| 38 | 10 | 114 | 75 | 2 | 37.5 | GO |
| 39 | 18 | 114 | 75 | 2 | 37.5 | GO |
| 40 | 18 | 114 | 75 | 1 | 75 | GO |
| 41 | 20 | 114 | 75 | 3 | 25 | UN |
| 42 | 20 | 114 | 75 | 2 | 37.5 | — |

TABLE 2-continued

| Run No. | | | | | | | |
|---|---|---|---|---|---|---|---|
| 43 | 31 | 114 | 75 | 2 | | 37.5 | PA |
| 44 | 31 | 114 | 75 | 1 | | 75 | UN |
| 45 | 32 | 114 | 75 | 1 | | 75 | UN |
| 46 | 32 | 114 | 75 | 2 | | 37.5 | PA |
| 47 | 33 | 114 | 75 | 2 | | 37.5 | PA |
| 48 | 33 | 114 | 75 | 1 | | 75 | UN |

| | | Crack Resistance | | | | | | | | |
|---|---|---|---|---|---|---|---|---|---|---|
| | | 1st Layer | | | 2nd Layer | | | 3rd Layer | | |
| Run No. | Foams Tested (Run No.) | Longi- tudinal | Circum- ferential | Other Direc- tions | Longi- tudinal | Circum- ferential | Other Direc- tions | Longi- tudinal | Circum- ferential | Other Direc- tions | Overall Eval- uation |
| 34 | 7 | GO | GO | GO | GO | GO | GO | — | — | — | EX |
| 35 | 14 | GO | GO | GO | GO | GO | GO | — | — | — | EX |
| 36 | 14 | GO | GO | GO | — | — | — | — | — | — | EX |
| 37 | 10 | GO | GO | GO | — | — | — | — | — | — | Ex |
| 38 | 10 | GO | GO | GO | GO | GO | GO | — | — | — | EX |
| 39 | 18 | GO | GO | GO | GO | GO | GO | — | — | — | EX |
| 40 | 18 | GO | GO | GO | — | — | — | — | — | — | EX |
| 41 | 20 | UN | UN | UN | UN | UN | UN | GO | UN | PA | UN |
| 42 | 20 | — | — | — | — | — | — | — | — | — | UN |
| 43 | 31 | GO | UN | PA | GO | PA | GO | — | — | — | UN |
| 44 | 31 | GO | UN | PA | — | — | — | — | — | — | UN |
| 45 | 32 | GO | UN | PA | — | — | — | — | — | — | UN |
| 46 | 32 | GO | UN | PA | GO | PA | GO | — | — | — | UN |
| 47 | 33 | GO | UN | PA | GO | PA | GO | — | — | — | UN |
| 48 | 33 | GO | UN | PA | — | — | — | — | — | — | UN |

Notes:
EX ... Excellent
GO ... Good
PA ... Passable
UN ... Unacceptable

TABLE 3

| | |
|---|---|
| Aging before compression: | 1 day |
| Foam plank thickness: | 100 mm |
| Infeed belt speed: | 12 m/min. |
| Infeed/outfeed speed ratio: | 1.05–1.33 |
| Compression distance D: (see FIG. 6) | 200 mm |
| Compression duration: | 3.6 sec. |
| Cycles of compression: | 1–3 |

What is claimed is:

1. A heat insulating structure for low-temperature or cryogenic pipings, comprising at least one heat insulating barrier and at least one moisture barrier which are laid on the outer surface of a piping to be heat-insulated, and at least one sheathing layer, wherein said heat insulating barrier comprises an extruded styrenic resin foam and wherein, as expressed in terms of the three-dimensional coordinates X (circumferential direction), Y (thicknesswise direction) and Z (longitudinal direction), said heat insulating barrier has a Y-axial water vapor permeability Py of 1.5 g/m²·hr or less and at least the heat insulating barrier most adjacent to said piping has X-axial and Z-axial elongations at rupture Ex and Ez in the range of 8 to 40 percent.

* * * * *